United States Patent [19]

Blair et al.

[11] Patent Number: 5,325,098
[45] Date of Patent: Jun. 28, 1994

[54] INTERACTING MULTIPLE BIAS MODEL FILTER SYSTEM FOR TRACKING MANEUVERING TARGETS

[75] Inventors: William D. Blair; Gregory A. Watson; Theodore R. Rice, all of Fredericksburg, Va.

[73] Assignee: The United States of America as represented by the Secretary of the Navy, Washington, D.C.

[21] Appl. No.: 69,818

[22] Filed: Jun. 1, 1993

[51] Int. Cl.$^5$ .......................................... G01S 13/66
[52] U.S. Cl. ........................................ 342/95; 342/96; 342/101; 342/195
[58] Field of Search ................... 342/95, 96, 101, 195

[56] References Cited

U.S. PATENT DOCUMENTS

| | | | |
|---|---|---|---|
| 4,148,029 | 4/1979 | Quesinberry | 343/9 |
| 4,179,696 | 12/1979 | Quesinberry et al. | 343/7.4 |
| 4,320,287 | 3/1982 | Rawicz | 235/412 |
| 4,855,932 | 8/1989 | Cangiani et al. | 364/516 |
| 4,954,837 | 9/1990 | Baird et al. | 342/458 |
| 4,959,800 | 9/1990 | Wooley | 364/516 |
| 4,989,186 | 1/1991 | Ricker | 367/97 |
| 5,019,824 | 5/1991 | Kumar | 342/195 |
| 5,214,433 | 5/1993 | Alouani et al. | 342/95 |

Primary Examiner—Mark Hellner
Attorney, Agent, or Firm—John D. Lewis; Jacob Shuster

[57] ABSTRACT

A filtering system used in the tracking of a maneuvering target is provided. A first filter estimates a partial system state at a time k in terms of target position measurements. A plurality of second filters are each provided with an acceleration model hypothesis from a prior time (k−1) free of position and velocity constraints. Each second filter generates an acceleration estimate at time k and a likelihood at time k that the acceleration model hypothesis is correct. The likelihoods from the second filters are summed to generate a probability vector at time k. A third interaction mixing filter generates the acceleration model hypotheses from prior time (k−1) using the probability vector from prior time (k−1) and the acceleration estimates from prior time (k−1). The third filter also provides an error covariance to the first filter to reflect the uncertainty in the acceleration model hypotheses from prior time (k−1). A probabilistic acceleration estimate for time k is formed as a sum of each of the acceleration estimates associated with each of the acceleration model hypotheses multiplied by a corresponding probability from the probability vector. The partial system state estimate and the probabilistic acceleration estimate are summed to generate a complete system state estimate at time k in terms of position, velocity and acceleration of the maneuvering target.

10 Claims, 5 Drawing Sheets

INTERACTING MULTIPLE BIAS MODEL FILTER SYSTEM FOR TRACKING MANEUVERING TARGETS

ORIGIN OF THE INVENTION

The invention described herein was made in the performance of official duties by employees of the Department of the Navy and may be manufactured, used, licensed by or for the Government for any governmental purpose without payment of any royalties thereon.

1. Field of the Invention

The invention relates generally to multiple model filter systems, and more particularly to an interacting multiple bias model filtering system that is used in the tracking of maneuvering targets.

2. Background of the Invention

An important problem in the art of state estimation is estimating the state of a linear system with Markovian switching coefficients. In this problem, the dynamics of the system are typically represented by multiple models which are hypothesized to be correct. Efficient management of the multiple hypotheses is critical to limiting the computational requirements while maintaining the performance capability of the system.

One example of such a state estimation problem involves the tracking of maneuvering targets. In particular, non-maneuvering targets can be accurately tracked with a constant velocity filter. However, when the target maneuvers, the quality of the position and velocity estimates provided by the constant velocity filter can degrade significantly. Furthermore, for a target undergoing a high "g" maneuver, the target track may be lost. A constant acceleration filter can be used to track such a target, but the accelerations of a maneuvering target are most often time-varying in the tracking frame. Also, the constant acceleration filter provides less accurate estimates than the constant velocity filter when the target is not maneuvering.

Another approach to this problem has been presented in application Ser. No. 07/899,803, filed Jun. 17, 1992, now U.S. Pat. No. 5,214,433 to Alouani et al. This approach uses a constant velocity filter and an acceleration filter, each filter operating independently of one another. Alouani et al. assume that there is always an acceleration present, and then uses its estimate in the ultimate solution only when it is deemed significant. However, Alouani et al. do not provide for gain adjustment in either filter when there is a "switch" in the system with respect to acceleration, i.e., when the target switches from being non-maneuvering (zero acceleration) to maneuvering (acceleration) or vice versa. Further, Alouani et al. provide for only one acceleration model.

The interacting multiple model (IMM) filter is a novel approach to merging different model hypotheses. See Bar-Shalom et al., "The Interacting Multiple Model Algorithm for Systems with Markovian Switching Coefficients", IEEE Transactions on Automatic Control, 1988, p.p. 780–793. The IMM technique has performed well when considering the performance and computational requirements of various other prior art merging techniques. However, in a system where the Markovian switching coefficients can be isolated to a system bias, the IMM approach requires that the "bias-free" portion of the system state be duplicated in each model and its corresponding filter.

The IMM filtering solution to the maneuvering target problem has been disclosed by Bar-Shalom et al. in "Tracking a Maneuvering Target Using Input Estimation Versus the Interacting Multiple Model Algorithm," IEEE Transactions on Aerospace and Electronic Systems, AES-24, November 1988, pp. 296–300. Briefly, the IMM solution consists of a filter for each model, a model probability evaluator, an estimate mixer at the input of the filters, and an estimate combiner at the output of the filters. The multiple models interact through mixing to track a target maneuvering through an arbitrary trajectory.

Figure 1:
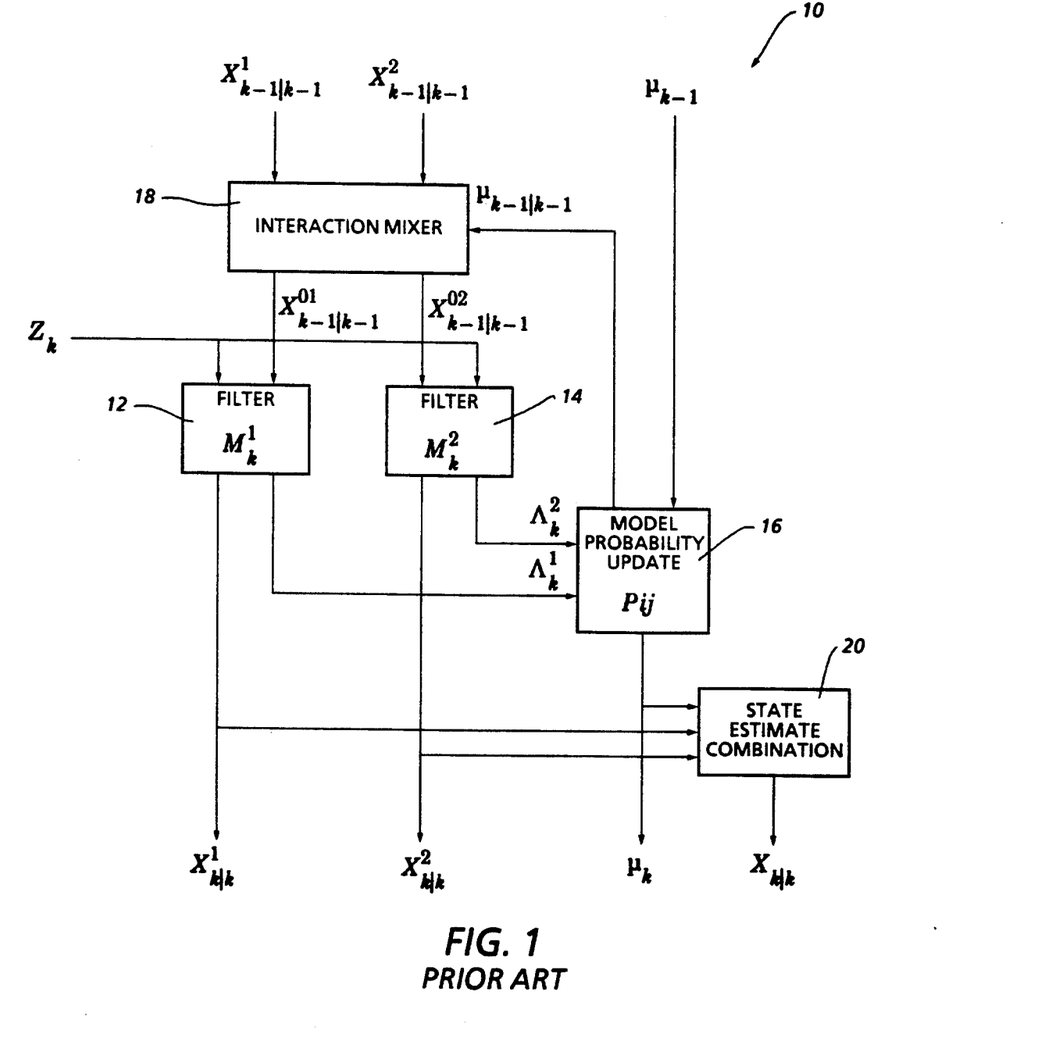
FIG. 1 is a flow diagram of a prior art IMM filtering system for state estimation.

The flow diagram of an IMM filter 10 having two filters 12 and 14 (only two are shown for purposes of clarity, however, up to N filters/models are possible) is given in FIG. 1, where:

$X_{k|k}$ is the state estimate for time k using measurements through time k based on both models (in general, N models), $X^j_{k|k}$ is the state estimate for time k using measurements through time k based on model j, $\Lambda^j_k$ is the model likelihood at time k based on model j, and $\mu_k$ is the vector of model probabilities at time k when all the likelihoods $\Lambda^j_k$ have been considered at model probability update 16.

Figure 2:
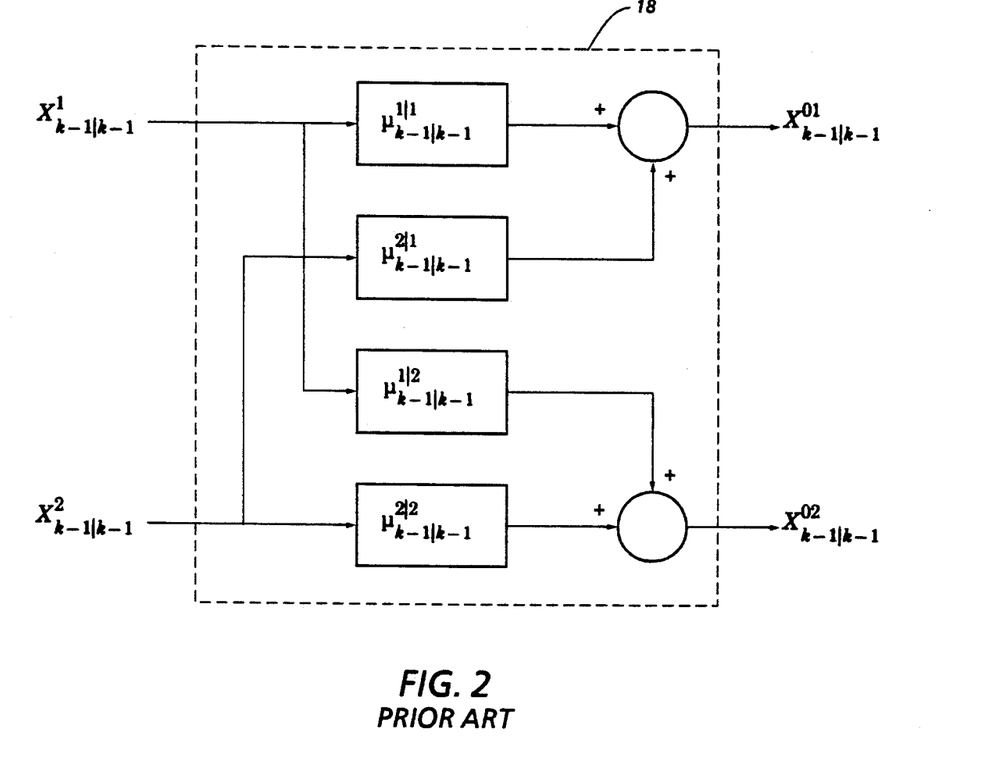
FIG. 2 is a detailed flow diagram of the interaction mixer shown in FIG. 1.

With the assumption that model switching is governed by an underlying Markov chain, an interaction mixer 18 uses the model probabilities $\mu_k$ and the model switching probabilities $p_{ij}$ to compute a mixed estimate $X^{0j}_{k|k}$ for filters 12 and 14. As shown in FIG. 2, mixer 18 blends the previous state estimates based on models 1 and 2 to obtain new state estimates for input into the two models. The mixing gains $\mu^{i|j}_{k-1|k-1}$ are computed from the previous model probabilities $\mu^i_{k-1}$ and the model switching probabilities $p_{ij}$ in the model probability update 16.

At the beginning of a filtering cycle, filters 12 and 14 use a prior mixed estimate $X^{0j}_{k-1|k-1}$ and a current measurement $Z_k$ to compute a new estimate $X^j_{k|k}$ and a likelihood $\Lambda^j_k$ for the j-th model filter. The likelihoods, prior model probabilities, and model switching probabilities are then used by model probability update 16 to compute new model probabilities. The overall state estimate $X_{k|k}$ is then computed at an estimate combiner 20 with the new state estimates and their model probabilities.

A system with Markov switching coefficients is denoted by $$X_{k+1} = F_k(\theta_{k+1}) + G_k(\theta_{k+1})W_k \quad (1)$$

$$Z_k = H_k(\theta_k)X_k + v_k \quad (2)$$

where $F_k$ is the state transition matrix for the system model,
$\theta_k$ is a finite state Markov chain taking values in $\{1, \ldots, N\}$ according to the probability $p_{ij}$ of transitioning from model i to model j,
$G_k$ is the system input matrix, and
$H_k$ is the system output matrix.

$W_k \sim N(\theta, Q_k)$ and $v_k \sim N(\theta, R_k)$ are white Gaussian errors for the system state and measurement processes, respectively. Here, $Q_k$ is the covariance of the system modeling errors and $R_k$ is the covariance of the system output measurement errors. The IMM solution for tracking with N models is outlined in the following five steps.

Step 1: Mixing of State Estimates

The filtering process starts with 'a priori' state estimates $X^j_{k-1|k-1}$, state error covariances $P^j_{k-1|k-1}$, and the associated probabilities $\mu^j_{k-1}$ for each $j^{th}$ filter model. The initial or mixed state estimate for model j at time k, or $M^j_k$, is computed as $$X^{0j}_{k-1|k-1} = \sum_{i=1}^{N} X^i_{k-1|k-1} \mu^{i|j}_{k-1|k-1} \quad (3)$$

where $$\mu^{i|j}_{k-1|k-1} = \frac{1}{\bar{c}_j} p_{ij}\mu^i_{k-1} \quad (4)$$

$$\bar{c}_j = \sum_{i=1}^{N} p_{ij}\mu^i_{k-1} \quad (5)$$

$p_{ij}$ is the assumed transition probability for switching from model i to model j, and $\bar{c}_j$ is a normalization constant. For every state estimate $X^i_{k|k}$ or $X^i_{k-1|k-1}$ (i.e., the mean of a Gaussian process), there is a corresponding $P^i_{k|k}$ or $P^i_{k-1|k-1}$ (i.e., the covariance of that Gaussian process). The initial or mixed covariance for $M^j_k$ is computed as $$P^{0j}_{k-1|k-1} = \sum_{i=1}^{N} [P^i_{k-1|k-1} + \quad (6)$$

$$(X^i_{k-1|k-1} - X^{0j}_{k-1|k-1})(X^i_{k-1|k-1} - X^{0j}_{k-1|k-1})^T]\mu^{i|j}_{k-1|k-1}$$

Step 2: Model-Conditioned Updates

The Kalman filtering equations provide the model-conditioned updates. For $M^j_k$, $$X^j_{k|k-1} = F^j_{k-1} X^{0j}_{k-1|k-1} \quad (7)$$

$$P^j_{k|k-1} = F^j_{k-1} P^{0j}_{k-1|k-1} (F^j_{k-1})^T + G^j_{k-1} Q^j_{k-1} (G^j_{k-1})^T \quad (8)$$

$$T^j_k = H^j_k P^j_{k|k-1} (H^j_k)^T + R_k \quad (9)$$

$$K^j_k = P^j_{k|k-1} (H^j_k)^T (T^j_k)^{-1} \quad (10)$$

$$\tilde{Z}^j_k = Z^j_k - H^j_k X^j_{k|k-1} \quad (11)$$

$$X^j_{k|k} = X^j_{k|k-1} + K^j_k[\tilde{Z}^j_k] \quad (12)$$

$$P^j_{k|k} = [I - K^j_k H^j_k] P^j_{k|k-1} \quad (13)$$

Step 3: Model Likelihood Computations

The likelihood of $M^j_k$ is computed with the filter residuals $\tilde{Z}^j_k$ (i.e., passed through model likelihoods $\Lambda^j_k$), the covariance of the filter residuals $T^j_k$, and the assumption of Gaussian statistics. The likelihood of $M^j_k$ is given by $$\Lambda^j_k = \frac{1}{\sqrt{|2\pi T^j_k|}} \exp[-0.5(\tilde{Z}^j_k)^T (T^j_k)^{-1} \tilde{Z}^j_k] \quad (14)$$

Step 4: Model Probabilities Update

The model probabilities are updated as $$\mu^j_k = \frac{1}{c} \Lambda^j_k \bar{c}_j \quad (15)$$

where $$c = \sum_{i=1}^{N} \Lambda^i_k \bar{c}_i \quad (16)$$

Step 5: Combination of State Estimates

The state estimate $X_{k|k}$ and error covariance $p_{k|k}$ for IMM filter 10 are obtained from a probabilistic sum of the individual filter outputs $$X_{k|k} = \sum_{i=1}^{N} X^i_{k|k} \mu^i_k \quad (17)$$

and $$P_{k|k} = \sum_{i=1}^{N} \mu^i_k [P^i_{k|k} + (X^i_{k|k} - X_{k|k})(X^i_{k|k} - X_{k|k})^T] \quad (18)$$

However, when implementing the IMM filter system for the maneuvering target problem, all model hypotheses filters must handle state estimation in terms of position and velocity (i.e., the $X_k$ terms). This includes those filters that model constant acceleration as well as those that model constant velocity and/or constant position. Thus, the IMM filter system is unnecessarily redundant and is therefore computationally inefficient when used to track a maneuvering target requiring at least one constant acceleration filter.

SUMMARY OF THE INVENTION

Accordingly, it is an object of the present invention to provide a filtering system and method that improves on the computational efficiency of an IMM filter system heretofore used in the tracking of a maneuvering target.

Another object of the present invention is to provide a filtering system and method that improves the computational efficiency of an IMM filtering system used in state estimation for systems with Markovian switching coefficients that can be isolated to a system bias.

Other objects and advantages of the present invention will become more obvious hereinafter in the specification and drawings.

In accordance with the present invention, a filtering system used in the tracking of a maneuvering target is provided. A target tracking sensor provides at least target position measurements. A first filter estimates a partial system state at time k in terms of the measurements. An error difference at time k between the partial system state estimate and the measurements is also generated. A plurality of second filters are each provided with an acceleration model hypothesis from a prior time (k−1) free of position and velocity constraints. Each second filter is also provided with the error difference to generate an acceleration estimate at time k and a likelihood at time k that the acceleration model hypothesis is correct. The likelihoods from the second filters are summed to generate a probability vector at time k. The probability vector defines a probability associated with each acceleration model hypothesis from prior time (k−1). A third interaction mixing filter generates the acceleration model hypotheses from prior time (k−1) using the probability vector from prior time (k−1) and the acceleration estimates from prior time (k−1). Each of the acceleration model hypotheses from prior time (k−1) is a probabilistic sum of the acceleration estimates from prior time (k−1) multiplied by the probability vector from prior time (k−1). The third filter also provides an error covariance to the first filter to reflect an uncertainty in the acceleration model hypotheses from prior time (k−1). A probabilistic acceleration estimate for time k is formed as a sum of each of the acceleration estimates associated with each of the acceleration model hypotheses multiplied by a corresponding probability from the probability vector. The partial system state estimate and the probabilistic acceleration estimate are summed to generate a complete system state estimate at time k defining position, velocity and acceleration of the maneuvering target.

DETAILED DESCRIPTION OF THE INVENTION

Figure 3:
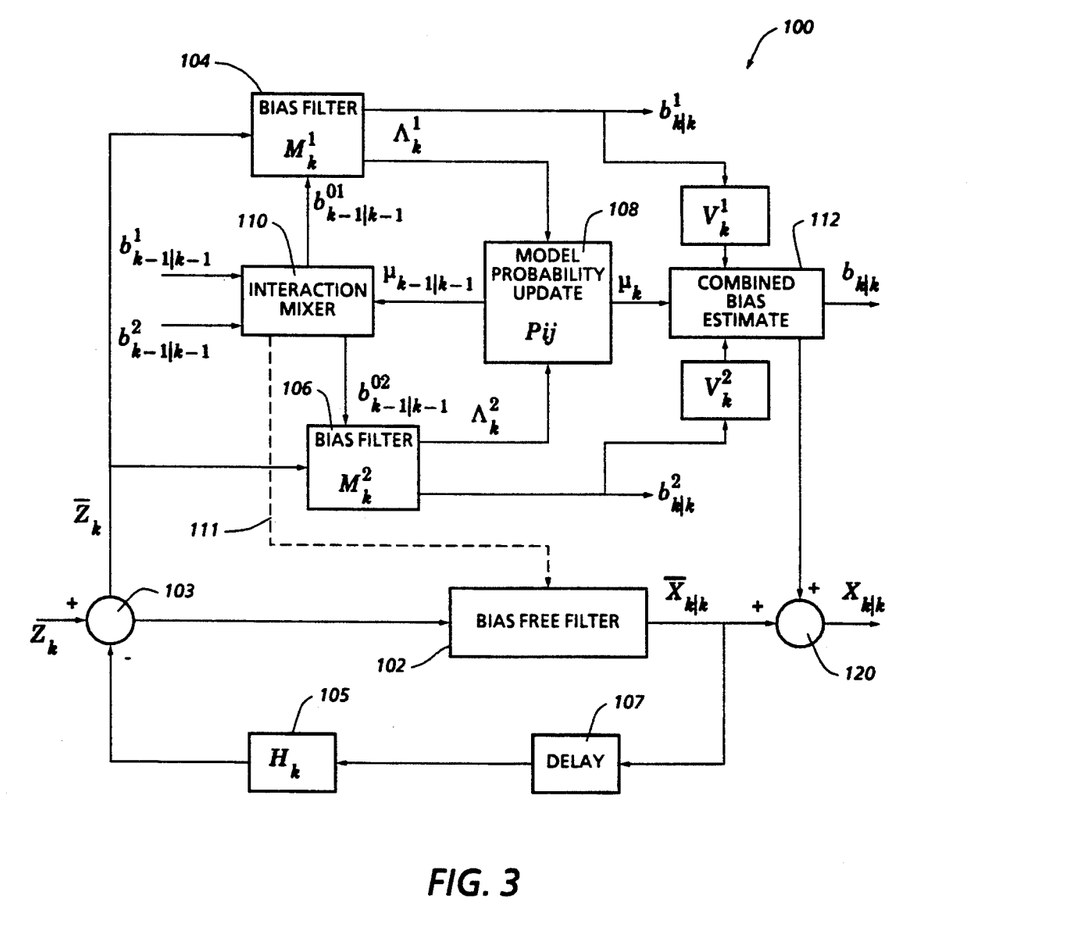
FIG. 3 is a flow diagram of an interacting multiple bias model (IMBM) filtering system according to the present invention.

Referring now to the drawings, and more particularly to FIG. 3, the interacting multiple bias model (IMBM) filtering system of the present invention is shown as a flow diagram and is designated generally by reference numeral 100. Briefly, IMBM filter system 100 consists of a filter 102 for the bias-free portion of the state model as well as filters 104 and 106 for each bias model, a model probability update 108 for bias model filters 104 and 106, an interaction mixer 110 at the input of bias filters 104 and 106, and an estimate combiner 112 receiving outputs from bias filters 104 and 106. Bias-free filter 102 and each bias filter 104 and 106 may be implemented as taught in U.S. Pat. No. 5,214,433, which is herein incorporated by reference. $H_k$ as denoted by box 105 in FIG. 3 is the system output matrix while "Delay" in box 107 denotes the time delay or lapse that occurs between measurements $Z_k$. Model probability update 108, interaction mixer 110 and estimate combiner 112 may each be implemented by conventional processors.

The flow diagram depicts IMBM system 100 using two bias models implemented by filters 104 and 106. Only two are shown for purposes of clarity while up to N filters/models are possible. In FIG. 3:

$X_{k|k}$ is the state estimate at time k using measurements $Z_k$ through time k as processed by both models (in general, all N models), $b^j_{k|k}$ is the bias estimate for time k using measurements through time k as based on model j, $\Lambda^j_k$ is the likelihood of model j at time k (A likelihood represents a measurement of the likelihood of an event being true.), and $\mu_k$ is the vector of model probabilities at time k when all the likelihoods have been considered. (Note that a likelihood is not restricted to be between 0 and 1 while a probability is always between 0 and 1.)

For the maneuvering target tracking problem, measurements $Z_k$ include target position (and possibly velocity) and the IMBM filtering system treats target acceleration as the bias which is modeled with multiple models having Markovian switching coefficients. Accordingly, bias-free filter 102 corresponds to a constant velocity filter, while bias filters 104 and 106 correspond to different acceleration filters. Note that since the constant velocity filter may be considered to include an acceleration model of zero, three acceleration models are available with a two acceleration filter IMBM.

With the assumption that the model switching is governed by an underlying Markov chain, mixer 110 uses the model probabilities $\mu_k$ and the model switching probabilities $p_{ij}$ to compute a prior mixed bias estimate $b^{0j}_{k-1|k-1}$ for each j-th bias filter. The mixing operation for the IMM and IMBM filters plays essentially the same role. However, the implementation of mixer 110 for the IMBM filter includes modification of the error covariance of bias-free filter 102 to reflect the spread of the means of bias filters 104 and 106. This is represented in FIG. 3 by dashed line 111.

At the beginning of a filtering cycle, bias filters 104 and 106 use a prior mixed bias estimate $b^{0j}_{k-1|k-1}$ from mixer 110 and the bias-free measurement error or residual $\widetilde{Z}_k$ from summer 103 as depicted in FIG. 3 to compute a new current estimate of the bias $b^j_{k|k}$ and a likelihood $\Lambda^j_k$ for the bias model within the filter. The likelihoods $\Lambda_k$, prior model probabilities $\mu_{k-1}$, and the model switching probabilities $p_{ij}$, are then used to compute new model probabilities $\mu_k$ for time k through updater 108. The overall bias estimate $b_{k|k}$ and compensated state estimate $X_{k|k}$ are then computed through summer 120 using the output of bias-free filter 102, the outputs of bias filters 104 and 106, and their model probabilities as diagrammed in FIG. 3.

The IMBM filtering method for tracking with N bias models is presented in the following five steps. For model j, $$X^j_{k|k} = \overline{X}_{k|k} + V^j_k b^j_{k|k} \tag{19}$$

$$P^j_{k|k} = \overline{P}_{k|k} + V^j_k \Sigma^j_{k|k}(V^j_k)^T \tag{20}$$

where:

$\overline{X}_{k|k}$ and $\overline{P}_{k|k}$ are the mean and error covariance, respectively, of bias-free filter 102, $V^j_k$ is the matrix gain for compensating the bias-free estimate with the bias estimate from model j at time k, $\Sigma^j_k$ is the bias error covariance for the j-th filter, and the superscript "T" denotes the matrix transpose of $V^j_k$. Hereinafter, a variable denoted with a "bar" overhead is associated with bias-free filter 102.

Step 1: Mixing of Bias Estimates

The filtering process starts with 'a priori' state estimate $\overline{X}_{k-1|k-1}$ and state error covariance $\overline{P}_{k-1|k-1}$ through bias-free filter 102. For bias filters 104 and 106, filter system 100 starts with a 'a priori' bias estimates $b^j_{k-1|k-1}$, bias error covariances $\Sigma^j_{k-1|k-1}$ and associated probabilities $\mu^j_{k-1}$ for each bias model. The initial or mixed state estimate for model j at time k, or $M^j_k$, is computed as $$X^{0j}_{k-1|k-1} = \sum_{i=1}^{N} X^i_{k-1|k-1} \mu^{i|j}_{k-1|k} \tag{21}$$

or

-continued
$$X^{0j}_{k-1|k-1} = \overline{X}_{k-1|k-1} + \sum_{i=1}^{N} V^i_{k-1} b^i_{k-1|k-1} \mu^{i|j}_{k-1|k} \quad (22)$$

The initial or mixed estimates for the bias-free and bias filters are given respectively by $$\overline{X}^0_{k-1|k-1} = \overline{X}_{k-1|k-1} \quad (23)$$

$$b^{0j}_{k-1|k-1} = \sum_{i=1}^{N} b^i_{k-1|k-1} \mu^{i|j}_{k-1|k} \quad (24)$$

where $$\mu^{i|j}_{k-1|k} = \frac{1}{\overline{c}_j} p_{ij} \mu^i_{k-1} \quad (25)$$

$$\overline{c}_j = \sum_{i=1}^{N} p_{ij} \mu^i_{k-1} \quad (26)$$

$p_{ij}$ is the assumed transition probability for switching from bias model i to bias model j, and $\overline{C}_j$ is a normalization constant. The initial or mixed error covariance $P^{0j}_k$ for $M^j_k$ is computed as follows $$P^{0j}_{k-1|k-1} = \sum_{i=1}^{N} [P^i_{k-1|k-1} + \quad (27)$$

$$(X^i_{k-1|k-1} - X^{0j}_{k-1|k-1})(X^i_{k-1|k-1} - X^{0j}_{k-1|k-1})^T] \mu^{i|j}_{k-1|k}$$

$$= \overline{P}_{k-1|k-1} + \sum_{i=1}^{N} [V^i_{k-1} \Sigma^i_{k-1|k-1} (V^i_{k-1})^T + \quad (28)$$

$$(\overline{X}_{k-1|k-1} + V^i_{k-1} b^i_{k-1|k-1} - \overline{X}_{k-1|k-1} - B^{0j}_{k-1|k-1}) \times$$

$$(\overline{X}_{k-1|k-1} + V^i_{k-1} b^i_{k-1|k-1} - \overline{X}_{k-1|k-1} - B^{0j}_{k-1|k-1})^T] \mu^{i|j}_{k-1|k}$$

$$= \overline{P}_{k-1|k-1} + \sum_{i=1}^{N} V^i_{k-1} \Sigma^i_{k-1|k-1} (V^i_{k-1})^T \mu^{i|j}_{k-1|k} + \quad (29)$$

$$\sum_{i=1}^{N} [(V^i_{k-1} b^i_{k-1|k-1} - B^{0j}_{k-1|k-1})(V^i_{k-1} b^i_{k-1|k-1} -$$

$$B^{0j}_{k-1|k-1})^T] \mu^{i|j}_{k-1|k}$$

$$= \overline{P}^{0j}_{k-1|k-1} + \sum_{i=1}^{N} V^i_{k-1} \Sigma^i_{k-1|k-1} (V^i_{k-1})^T \mu^{i|j}_{k-1|k} \quad (30)$$

where $$B^{0j}_{k-1|k-1} = \sum_{i=1}^{N} V^i_{k-1} b^i_{k-1|k-1} \mu^{i|j}_{k-1|k} \quad (31)$$

Unlike the prior art, the initial or mixed error covariance matrix for bias-free filter 102 also reflects the uncertainty in the bias model selection (represented by dashed line 111) from mixer 110 as diagrammed in FIG. 3 to bias-free filter 102 using the model probabilities and is given by $$\overline{P}^0_{k-1|k-1} = \sum_{j=1}^{N} \mu^j_{k-1} \overline{P}^{0j}_{k-1|k-1} \quad (32)$$

$$= \overline{P}_{k-1|k-1} + \quad (33)$$

$$\sum_{j=1}^{N} \mu^j_{k-1} \left( \sum_{i=1}^{N} [(V^i_{k-1} b^i_{k-1|k-1} - B^{0j}_{k-1|k-1}) \times \right.$$

$$\left. (V^i_{k-1} b^i_{k-1|k-1} - B^{0j}_{k-1|k-1})^T] \mu^{i|j}_{k-1|k} \right)$$

where $\overline{P}_{k-1|k-1}$ is the error covariance associated with bias-free filter 102 acting independently of bias filters 104 and 106. The remaining portion of the expression reflects in bias-free filter 102 an uncertainty in the bias model selection at time (k−1). The initial or mixed error covariance matrices for bias filters 104 and 106 are given by $$\Sigma^{0j}_{k-1|k-1} = \sum_{i=1}^{N} [\Sigma^i_{k-1|k-1} + \quad (34)$$

$$(b^i_{k-1|k-1} - b^{0j}_{k-1|k-1})(b^i_{k-1|k-1} - b^{0j}_{k-1|k-1})^T] \mu^{i|j}_{k-1|k}$$

Step 2: Model-Conditioned Updates

The two-stage filtering equations provide the model-conditioned updates. For bias-free filter 102

$$\overline{X}_{k|k-1} = F_{k-1} \overline{X}^0_{k-1|k-1} \quad (35)$$

$$\overline{P}_{k|k-1} = F_{k-1} \overline{P}^0_{k-1|k-1} F^T_{k-1} + Q^X_{k-1} \quad (36)$$

$$\overline{K}_k = \overline{P}_{k|k-1} H_k^T (H_k \overline{P}_{k|k-1} H_k^T + R_k)^{-1} \quad (37)$$

$$\overline{X}_{k|k} = \overline{X}_{k|k-1} + \overline{K}_k [Z_k - H_k \overline{X}_{k|k-1}] \quad (38)$$

$$\overline{P}_{k|k} = [I - \overline{K}_k H_k] \overline{P}_{k|k-1} \quad (39)$$

and for bias filter $M^j_k$ $$b^j_{k|k-1} = D^j_{k-1} b^j_{k-1|k-1} \quad (40)$$

$$\Sigma^j_{k|k-1} = D^j_{k-1} \Sigma^{0j}_{k-1|k-1} (D^j_{k-1})^T + G^{bj}_{k-1} Q^{bj}_{k-1} (G^{bj}_{k-1})^T \quad (41)$$

$$K^{bj}_k = \Sigma^j_{k|k-1} (S^j_k)^T [H_k \overline{P}_{k|k-1} H_k^T + R_k + S^j_k \Sigma^j_{k|k-1} (S^j_k)^T]^{-1} \quad (42)$$

$$\tilde{Z}^j_k = Z_k - H_k \overline{X}_{k|k-1} - S^j_k b^j_{k|k-1} \quad (43)$$

$$b^j_{k|k} = b^j_{k|k-1} + K^{bj}_k [\tilde{Z}^j_k] \quad (44)$$

$$\Sigma^j_{k|k} = [I - K^{bj}_k S^j_k] \Sigma^j_{k|k-1} \quad (45)$$

$$S^j_k = H_k U^j_k + C^j_k \quad (46)$$

$$U^j_k = (F_{k-1} V^j_{k-1} + G^j_{k-1})(D^j_{k-1})^{-1} \quad (47)$$

$$V^j_k = (I - \overline{K}_k H_k) U^j_k - \overline{K}_k C^j_k \quad (48)$$

where $U^j_k$ is the matrix gain for bias model j at time k that provides observations of the acceleration (system bias) through the residual of the bias-free filter.

Step 3: Model Likelihood Computations

The likelihood of $M^j_k$ is computed with the filter residuals $\tilde{Z}^j_k$ output from summer 103 to the bias filters, the covariance of the filter residuals $T^j_k$, and the assumption of Gaussian statistics. The likelihood of $M^j_k$ is given by $$\Lambda^j_k = \frac{1}{\sqrt{|2\pi T^j_k|}} \exp[-0.5(\tilde{Z}^j_k)^T (T^j_k)^{-1} \tilde{Z}^j_k] \quad (49)$$

$$T^j_k = H_k \overline{P}_{k|k-1} H_k^T + R_k + S^j_k \Sigma^j_{k|k-1} (S^j_k)^T \quad (50)$$

Step 4: Model Probabilities Update

The model probabilities are updated at model probability updates 108 as diagrammed in FIG. 3 as $$\mu_k^j = \frac{1}{c} \Lambda_k^j \bar{c}_j \quad (51)$$

where $$c = \sum_{i=1}^{N} \Lambda_k^i \bar{c}_i \quad (52)$$

Step 5: Combination of State Estimates

The state estimate $X_{k|k}$ and error covariance $P_{k|k}$ for IMBM filter system 100 are output as a sum from summer 120 as $$X_k = \bar{X}_{k|k} + \sum_{i=1}^{N} V_k^i b_{k|k}^i \mu_k^i \quad (53)$$

$$P_{k|k} = \bar{P}_{k|k} + \sum_{i=1}^{N} \mu_k^i [V_k^i \Sigma_{k|k}^i (V_k^i)^T + (V_k^i b_{k|k}^i - B_{k|k})(V_k^i b_{k|k}^i - B_{k|k})^T] \quad (54)$$

while a probabilistic bias sum $b_{k|k}$ and bias error covariance $\Sigma_{k|k}$ (not shown) are output from combiner 112 as $$b_{k|k} = \sum_{i=1}^{N} b_{k|k}^i \mu_k^i \quad (55)$$

$$\Sigma_{k|k} = \sum_{i=1}^{N} \mu_k^i [\Sigma_{k|k}^i + (b_{k|k}^i - b_{k|k})(b_{k|k}^i - b_{k|k})^T] \quad (56)$$

$$B_{k|k} = \sum_{i=1}^{N} V_k^i b_{k|k}^i \mu_k^i \quad (57)$$

For the maneuvering target tracking problem, the IMBM filtering system treats target acceleration as the bias with Markovian switching coefficients. The bias-free filter corresponds to a constant velocity filter, while the bias filters may correspond to constant acceleration model filters. It is to be understood that any one (or more) of a variety of acceleration model filters may be used by the present invention. For instance, one constant acceleration model might have a large process noise variance for maneuver response, while another constant acceleration model might utilize a smaller process noise variance and the kinematic constraint for constant speed targets as presented by Alouani et al. in "Use of Kinematic Constraint in Tracking Constant Speed, Tracking Maneuvering Targets," Proceedings of 30th IEEE Conference on Decision and Control, 1991, pp. 2059-2062.

Figure 4:
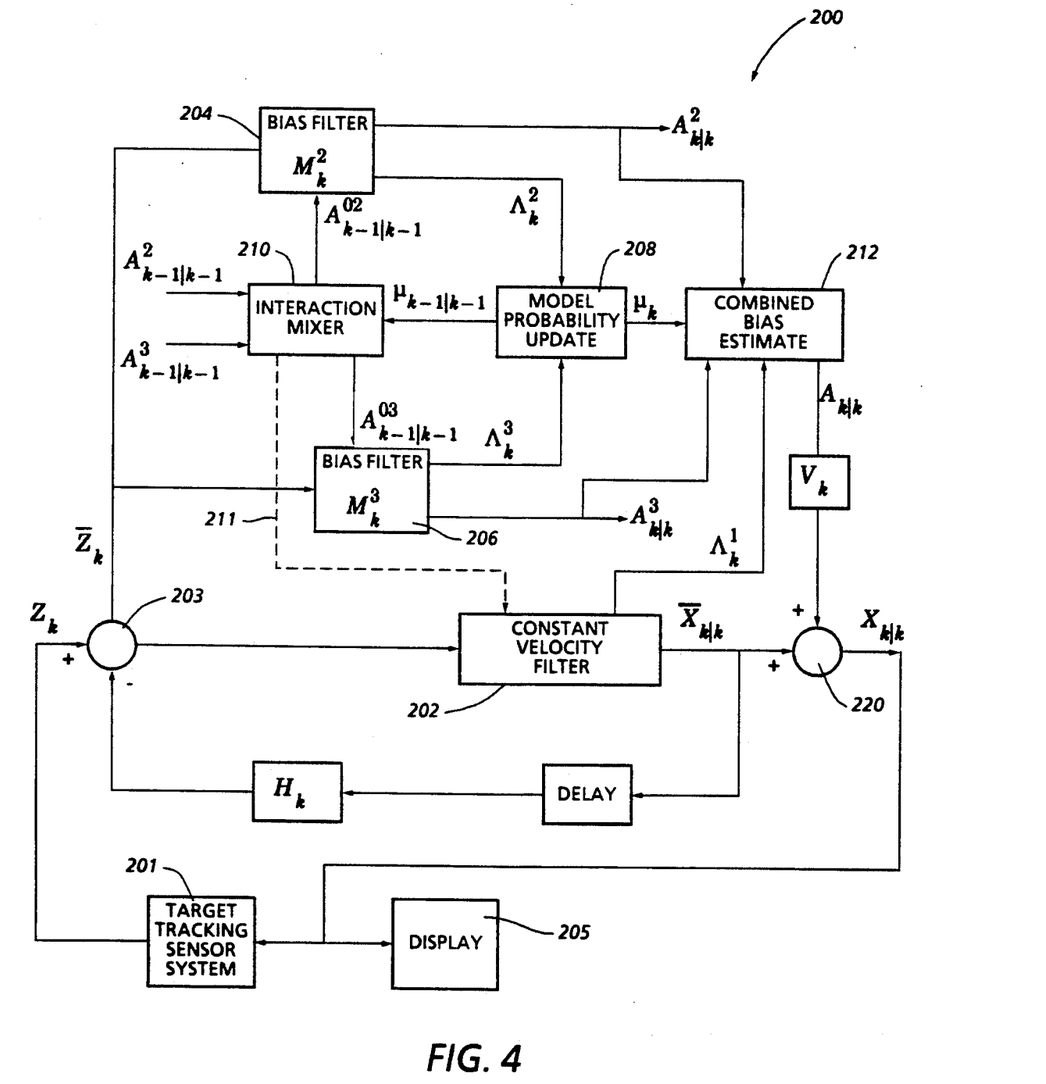
FIG. 4 is a flow diagram of an IMBM filtering system simplified for tracking a maneuvering target using two constant acceleration models.

In FIG. 4, an IMBM filter system 200 is shown designed to operate with a zero acceleration filter and two constant acceleration filters as just described. A target sensor system 201 provides measurements $Z_k$ of target position (and possibly velocity. Target tracking sensor system 201 may be any of the conventionally known tracking systems utilizing radar, laser or electro-optic techniques. IMBM filter system 200 includes a constant velocity filter 202 and embodies three bias models. The first bias model, $M^1_k$, would correspond to a bias with zero mean and error covariance and would therefore not require a filter. As shown in FIG. 4, the second bias model, $M^2_k$, would correspond to a constant state model with a kinematic constraint as implemented by filter 204. The third bias model, $M^3_k$, would correspond to a constant state model with a greater model uncertainty as implemented by filter 206. Similar to the IMBM filter system shown in FIG. 3, system 200 includes an interaction mixer 210, a model probability update 208, an estimate combiner 212, and summers 203 and 220. Operation of system 200 is identical to that described above where the system bias is acceleration A. With these model configurations, the $U^j_k$ and $V^j_k$ gains for each model can be shown to be equivalent with the use of the kinematic constraint not affecting the constant velocity filter. The pseudomeasurement for the kinematic constraint is input directly into the corresponding bias filter 204. Note that since the gain $V_k$ is common to both bias models, further simplifications can be made in the IMBM filtering system given in FIG. 3, namely only one $V_k$ multiplier is required as shown in FIG. 4. The target state estimate $X_{k|k}$ may be fed back to target tracking sensor system 201 (or another combat control system—not shown) to indicate a new target state to control system 201. Alternatively or simultaneously, the target state estimate may be displayed on a display 205.

Figure 5:
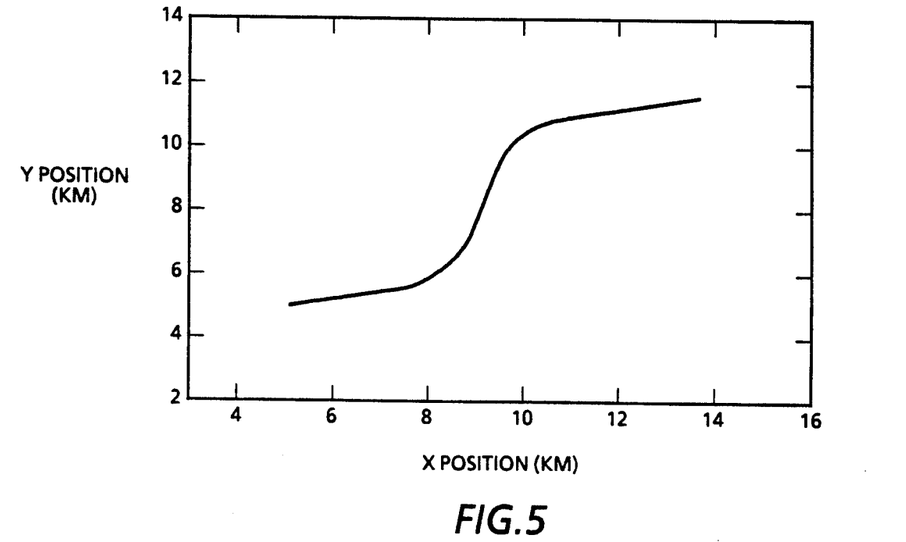
FIG. 5 graphically illustrates the target trajectory profile of a simulated target.
Figure 6:
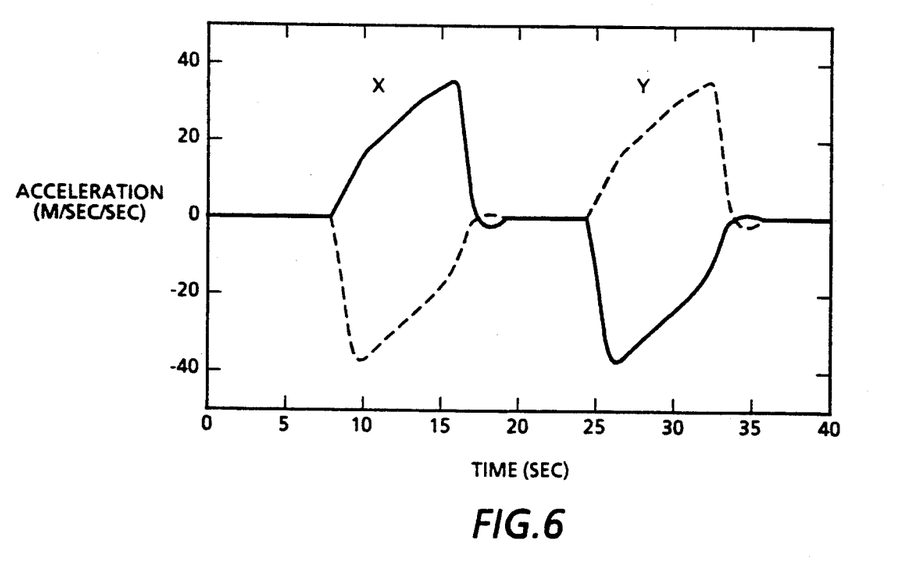
FIG. 6 is the acceleration profile of the simulated target to which FIG. 5 relates.

To demonstrate the maneuvering target tracking performance of the IMBM filtering system versus the IMM filtering system, simulation results will be presented for a radar tracking system. Measurements are zero-mean Gaussian with standard deviations of 8 meters in range and 0.002 radians in bearings and elevations. The radar measures the target position with period of 0.25 seconds. Targets performing multiple "g" maneuvers are expected. The IMM and IMBM filtering systems were both provided with a constant velocity and two constant acceleration models, and were tuned with the target trajectory given in FIG. 5. The simulated target moved with a constant speed of 330 m/s and maneuvered with 4 g's of acceleration from 8 to 16 seconds and from 24 to 32 seconds as shown in FIG. 6. A second order, critically damped system with a natural frequency of 2 rad/s was used to model the dynamics of the target.

For the IMM, the process noise covariances were $Q^1_k=0.01 I_3$ m$^2$/s$^4$, $Q^2_k=26 I_3$ m$^2$/s$^6$, and $Q^3_k=384 I_3$ m$^2$/s$^6$, where $I_3$ is the 3×3 identity matrix. The constraint variance was $(500(0.9^k)+16)$ m$^2$/s$^4$. The initial model probabilities were $\mu_0=[0.9\ 0\ 0.1]$ and the model switching probability matrix was $$\begin{bmatrix} 0.970 & 0.03 \\ 0.050 & 0.950 \\ 0 & 0.1 & 0.9 \end{bmatrix}$$

For the IMBM, the process noise variances were $\bar{Q}_k^x=100 I_3$ m$^2$/s$^4$, $Q^{b1}_k=0 I_3$, $Q^{b2}_k=25 I_3$ m$^2$/s$^6$, and $Q^{b3}_k=400 I_3$ m$^2$/s$^6$. The constraint variance was $(500(0.9)^k+40)$ m$^2$/s$^4$. The initial model probabilities were $\mu_0=[0.9\ 0\ 0.1]$ and the model switching probability matrix was $$\begin{bmatrix} 0.95 & 0.05 \\ 0.1 & 0.90 \\ 0 & 0.10.9 \end{bmatrix}$$

Simulation showed that similar tracking results were achieved by both the IMM filter and the IMBM filter of the present invention. A comparison of the computations required by the IMM and IMBM (configured as shown in FIG. 4) are compared in Table 1. When completing the computational count, generic matrices were assumed for the models and only symmetrical properties of the covariance matrices were considered. Thus, the computation costs for the filter updates are higher than the computations required in an efficient implementation of the filters. Computational cost formulas used as a basis for the computational count may be found in "State Estimation in the Presence of Random Bias", by P. Xia, Masters Thesis, Tenn. Tech. University, August, 1991. As indicated in Table 1, the IMBM requires only about 32% of the computations required by the IMM. For the IMM filter with more than three models, the computational saving provided by the IMBM algorithm would be even larger.

TABLE 1

Comparison of Computational Costs of IMM and IMBM Filters

|  | IMM | | IMBM | | Percent Saved | |
|---|---|---|---|---|---|---|
|  | MULT | ADD | MULT | ADD | MULT | ADD |
| Mixing | 1480 | 870 | 340 | 250 | 77 | 72 |
| Filter Update | 7550 | 7240 | 2540 | 2260 | 66 | 69 |
| Output | 490 | 290 | 200 | 160 | 58 | 45 |
| Total | 9520 | 8400 | 3080 | 2670 | 68 | 68 |

Tables 2 and 3 provide results of a detailed computational study of the IMM and IMBM filter designs for a single coordinate. Table 2 assumes a constant velocity model and a constant acceleration model, while Table 3 assumes a constant velocity model and two constant acceleration models. When completing the computational counts, the matrix equations were expressed as scalar equations so that the redundant and unnecessary calculations could be easily eliminated. For example, multiplication by one and zero and additions with zero were eliminated. The results in Tables 2 and 3 indicate that IMBM filter design of the present invention provides a computational saving of about 50% when two models are used and about 60% when three models are used.

TABLE 2

Detailed Comparison of Computational Costs Two Models for Single Coordinate

|  | IMM | | IMBM | | Percent Saved | |
|---|---|---|---|---|---|---|
|  | MULT | ADD | MULT | ADD | MULT | ADD |
| Mixing | 53 | 39 | 20 | 11 | 62 | 72 |
| Model Update | 56 | 45 | 27 | 22 | 52 | 51 |
| Model Likelihoods | 18 | 6 | 18 | 6 | 0 | 0 |
| Probability Update | 4 | 1 | 4 | 1 | 0 | 0 |
| Combined Output | 29 | 22 | 12 | 8 | 59 | 64 |
| Total | 160 | 113 | 81 | 48 | 49 | 58 |

TABLE 3

Detailed Comparison of Computational Costs Three Models for Single Coordinate

|  | IMM | | IMBM | | Percent Saved | |
|---|---|---|---|---|---|---|
|  | MULT | ADD | MULT | ADD | MULT | ADD |
| Mixing | 129 | 98 | 45 | 31 | 65 | 68 |
| Model Update | 95 | 77 | 37 | 27 | 61 | 65 |
| Model Likelihoods | 27 | 9 | 27 | 9 | 0 | 0 |
| Probability Update | 6 | 2 | 6 | 2 | 0 | 0 |
| Combined Output | 44 | 40 | 15 | 12 | 66 | 63 |
| Total | 301 | 226 | 130 | 81 | 57 | 64 |

The advantages of the present invention are numerous. A novel filter design has been presented for estimation of the state of a linear system with Markovian switching coefficients that can be isolated as a system bias. When applied to the tracking of maneuvering targets, the IMBM provides results that are very similar to those provided by the IMM filter while requiring far fewer computations than the IMM filter when a constant velocity model and two constant acceleration models are used.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A filtering system used in tracking of a maneuvering target comprising: a target tracking sensor providing target position measurements; first filter means for determining a partial system state estimate at a time K in terms of said measurements; means for generating an error difference at time K between said partial system state estimate and said measurements; bias filter means provided with prior acceleration model hypotheses from a time (K−1) free of position and velocity constraints and said error difference for generating acceleration estimates at time K and likelihoods at time K that said prior model hypotheses are correct; updating means summing said likelihoods from said bias filter means for generating a probability vector at time K defining probability associated with each said prior acceleration model hypothesis; interaction mixing filter means for generating each said prior acceleration model hypothesis using said probability vector from prior time (K−1) and said acceleration estimates from said prior time (K−1) as a probabilistic sum of said acceleration estimates from prior time (K−1) multiplied by said probability vector from prior time (K−1), means associated with said interaction mixing filter means for supply of an error covariance to said first filter means to reflect therein an uncertainty with respect to each said prior acceleration model hypothesis; bias estimator means for generating a probabilistic acceleration estimate from each of said acceleration estimates and said probability vector at time K as a sum of each of said acceleration estimates associated with each of said prior acceleration model hypotheses multiplied by a corresponding probability from said probability vector; and means summing said partial system state estimate and said probabilistic acceleration estimate for generating a complete system state estimate at time K defining position, velocity and acceleration of said maneuvering target.

2. A system as in claim 1 wherein said bias filter means includes constant acceleration filters.

3. A system as in claim 1 wherein said target tracking sensor further provides target velocity measurements.

4. A system as in claim 1 wherein said first filter means and each said bias filter means comprises a Kalman filter network.

5. A system as in claim 1 wherein said system state estimate at time k is a feedback input to said target tracking sensor.

6. A system as in claim 1 further comprising means for displaying said system state estimate at time k.

7. In a target tracking system having a target tracking sensor, bias-free filter means rendered operative by target measurement data form the sensor for supplying target position and velocity estimates and an interacting multiple model filter network operatively connected to the sensor for correcting said target position and velocity estimates, including: an interaction mixer providing prior model hypotheses and means supplying error covariance from the interaction mixer to the bias-free filter means for modifying operation thereof reflecting uncertainty of the prior model hypotheses.

8. The system as defined in claim 7 including an input summer connected to the sensor through which the target measurement data is supplied to the bias-free filter means and the interacting multiple model filter network, and time delay means connected to the bias-free filter means through which prior target measurement data is supplied to the interacting multiple model filter network from which the prior model hypotheses is derived by the interaction mixer.

9. The system as defined in claim 8 wherein the interacting multiple model filter network further includes: bias filters receiving the target measurement data from the sensor through the input summer to provide target acceleration estimates, a model probability updater receiving likelihood data from the bias filters to provide a probability vector fed to the interaction mixer and combiner means receiving the target acceleration estimates from the bias filters and the probability vector from the updater for providing an overall target state estimate.

10. The system as defined in claim 7 wherein the interacting multiple model filter network further includes: bias filters receiving the target measurement data from the sensor to provide target acceleration estimates, a model probability updater receiving likelihood data from the bias filters to provide a probability vector fed to the interaction mixer and combiner means receiving the target acceleration estimates from the bias filters and the probability vector from the updater for providing an overall target state estimate.

* * * * *